(12) United States Patent
Goldman (10) Patent No.: US 10,074,355 B2
(45) Date of Patent: Sep. 11, 2018

(54) HEADSET WITH HEAR-THROUGH MODE

(71) Applicant: GN Audio A/S, Ballerup (DK)

(72) Inventor: Tomasz Goldman, Ballerup (DK)

(73) Assignee: GN AUDIO A/S (DK)

( * ) Notice: Subject to any disclaimer, the term of this patent is extended or adjusted under 35 U.S.C. 154(b) by 0 days.

(21) Appl. No.: 15/382,695

(22) Filed: Dec. 18, 2016

(65) Prior Publication Data

US 2017/0193978 A1 Jul. 6, 2017

(30) Foreign Application Priority Data

Dec. 30, 2015 (EP) .................................... 15203184

(51) Int. Cl.
*G10K 11/16* (2006.01)
*G10K 11/178* (2006.01)
(Continued)

(52) U.S. Cl.
CPC ........ *G10K 11/178* (2013.01); *G10K 11/1784* (2013.01); *G10L 25/84* (2013.01);
(Continued)

(58) Field of Classification Search
CPC .. H04R 1/1091; H04R 1/1041; H04R 1/1016; H04R 1/1083; H04R 3/005; H04R 5/033;
(Continued)

(56) References Cited

U.S. PATENT DOCUMENTS 8,798,283 B2   8/2014  Gauger, Jr. et al.
2001/0046304 A1*  11/2001  Rast ..................... H04R 1/1041
                                                              381/74

(Continued)

OTHER PUBLICATIONS

European Search Report dated Jun. 13, 2016 for European patent application No. 15203184.5.

*Primary Examiner* — Leshui Zhang
(74) *Attorney, Agent, or Firm* — Altera Law Group, LLC (57) ABSTRACT

A headset for voice communication is disclosed, the headset comprising at least one earphone having a speaker and one or more microphones. The headset is configured to be operated in a first mode in which an electronic noise cancelling circuit is configured to receive ambient audio via at least a first of the one or more microphones to implement an active noise cancelling function and to provide a noise cancelling audio signal to the speaker, and in a second mode in which ambient audio is provided as a hear-through audio signal to the speaker. The headset for voice communication is configured to detect whether a call is ongoing, and to provide a call signal in response to the detection. The headset comprises the electronic noise cancelling circuit, a voice activity detection unit configured to indicate when a user speaks, a switching element configured to switch the headset between operating in the first mode and operating in the second mode, wherein, when the headset is operated in the first mode and the call signal indicates that the user is not in a call, the switching element is configured to switch the headset from operating in the first mode to operating in the second mode when the voice activity detection unit indicates that the user speaks.

20 Claims, 9 Drawing Sheets

(51) Int. Cl.
*H04R 1/08* (2006.01)
*H04R 1/10* (2006.01)
*G10L 25/84* (2013.01)
*H04M 1/60* (2006.01)

(52) U.S. Cl.
CPC ............ *H04M 1/6058* (2013.01); *H04R 1/08* (2013.01); *H04R 1/1008* (2013.01); *H04R 1/1041* (2013.01); *G10K 2210/1081* (2013.01); *G10K 2210/3026* (2013.01); *G10K 2210/3027* (2013.01)

(58) Field of Classification Search
CPC ........ H04R 2201/107; H04R 2201/109; H04R 2400/01; H04R 2420/07; H04R 2499/11; H04R 1/10; H04R 29/00; H04R 29/001; H04R 29/002; H04R 29/003; H04R 29/004; H04R 29/005; H04R 29/006; H04R 29/007; H04R 25/30; H04R 25/305; H04R 25/70; H04R 2201/00; G10L 21/0208; G10L 2021/02087; H04M 1/6041; H04M 1/6058; H04M 1/6066; H04M 1/05; H04M 2250/02; H04M 2001/274541; H04B 1/385; H04B 1/05; H04B 1/6058; H04B 1/6066; H04S 1/005

USPC .... 381/74, 73.1, 309, 312–322, 328, 58–60, 381/122, 123, 71.1–71.14; 455/569.1, 455/569.2, 570, 575.2; 700/94; 379/391, 379/392

See application file for complete search history.

(56) References Cited

U.S. PATENT DOCUMENTS

| | | |
|---|---|---|
| 2003/0228023 A1 | 12/2003 | Burnett et al. |
| 2004/0204168 A1* | 10/2004 | Laurila .................. H04M 1/05 455/569.1 |
| 2010/0131269 A1 | 5/2010 | Park et al. |
| 2010/0296668 A1* | 11/2010 | Lee .................... G10K 11/1784 381/94.7 |
| 2013/0163775 A1* | 6/2013 | Yamkovoy ......... G10K 11/1782 381/71.6 |
| 2014/0093091 A1 | 4/2014 | Dusan et al. |
| 2014/0126734 A1* | 5/2014 | Gauger, Jr. ............ H04R 3/002 381/71.6 |
| 2014/0213329 A1* | 7/2014 | Wu ..................... H04M 1/6058 455/570 |
| 2014/0270200 A1* | 9/2014 | Usher .................. H04R 1/1041 381/57 |
| 2015/0256660 A1 | 9/2015 | Kaller et al. |

* cited by examiner

HEADSET WITH HEAR-THROUGH MODE

TECHNICAL FIELD

A headset for voice communication and a method of operating a headset for voice communication having a noise cancelling function is provided, particularly disclosed is a headset and a method for automatic selection of a hear-through mode.

BACKGROUND OF THE INVENTION

Headsets are widely used, both in noisy environments in general, in office settings, and while listening to music or entertainment anywhere.

Many of the headsets include one or both of passive and active noise reducing functionalities, limiting a user's exposure to external or environmental noise by preventing ambient noise from reaching the ear of a user.

Passive noise reduction in headsets typically occurs by attenuating sound waves as they reach a user's ears, either by means of an enclosure around the outer ear of a user, such as ear cushions, or by means of e.g. ear gels extending in to the ear canal and at least partly blocking the ear canal.

Active noise reduction headsets typically comprise electronic circuits which are used to generate anti-noise signals which destructively interfere with ambient sound to cancel the ambient sound. Active noise reduction headsets may have different settings allowing for the effect of the active noise reduction to have a smaller or larger effect to suit different users' preferences.

For such headsets comprising either or both passive and active noise reduction, often a hear-through functionality is provided. This enables the user to hear his or her own voice in a more natural way, which increases the comfort level of the user when he is speaking, and furthermore allows the user to speak at a volume level suited for a present audio level in the environment.

Typically, the headsets include a switch to select when the hear-through mode should be activated.

In some cases, it may however, be advantageously to automatically change the settings of the headset.

It is known from e.g. U.S. Pat. No. 8,798,283 that certain external events, such as voice or an alarm may trigger the hear-through mode. However, in the absence of such specific events, the user will have to manually trigger for example a hear-through mode.

SUMMARY

It is an object of the present invention to improve the functionality of headsets for voice communication having an active noise cancelling function.

In one aspect according to the present disclosure, a headset for voice communication is provided, the headset comprising at least one earphone having a speaker and one or more microphones, the headset being configured to operate in a first mode in which an electronic noise cancelling circuit is configured to receive ambient audio via at least a first of the one or more microphones to implement an active noise cancelling function and to provide a noise cancelling audio signal to the speaker, and in a second mode in which ambient audio is provided as a hear-through audio signal to the speaker. The headset for voice communication is configured to detect whether a call is ongoing, and to provide a call signal in response to the detection. The headset comprises the electronic noise cancelling circuit, a voice activity detection unit configured to indicate when a user speaks and a switching element configured to switch the headset between operating in the first mode and operating in the second mode, wherein, when the headset is operated in the first mode and the call signal indicates that the user is not in a call, and when furthermore the voice activity detection unit indicates that the user speaks, the switching element is configured to switch the headset from operating in the first mode to operating in the second mode.

In another aspect according to the present disclosure, a method of operating a headset for voice communication having a noise cancelling function is provided. The headset comprises a speaker, one or more microphones and an electronic noise cancelling circuit implementing the noise cancelling function. The method comprises in a first operating mode, receiving ambient audio via at least a first of the one or more microphones to provide a first received ambient audio signal, providing the received ambient audio signal to the electronic noise cancelling circuit to obtain a noise cancelling signal, supplying the noise cancelling signal to the speaker. In a second operating mode, receiving ambient audio via at least a second of the one or more microphones, and providing the ambient audio as a hear-through audio signal to the speaker. The method further comprises detecting whether a call is ongoing and providing a call signal in response to the detection, wherein when the headset is operated in the first mode and the call signal indicates that a user is not in a call, detecting whether the user is speaking using a voice activity detector, switching to the second operating mode if it is detected by the voice activity detector that the user is speaking.

In a further aspect according to the present disclosure, a headset for voice communication is provided, the headset comprising at least one earphone having a speaker and one or more microphones, the headset being configured to operate in a first mode in which input audio is provided as a noise cancelling audio signal to the speaker, and in a second mode in which ambient audio is provided as a hear-through audio signal to the speaker. The headset for voice communication is configured to detect whether a call is ongoing, and to provide a call signal in response to the detection. The headset comprises the electronic noise cancelling circuit, a voice activity detection unit configured to indicate when a user speaks and a switching element configured to switch the headset between operating in the first mode and operating in the second mode.

When the headset is operated in the first mode and the call signal indicates that the user is not in a call, an indication from the voice activity detection unit indicating that the user speaks may trigger the switching element to switch the headset from operating in the first mode to operating in the second mode.

Input audio, such as ambient audio or audio received via an audio input port, such as an audio jack, may be provided to an electronic noise cancelling circuit configured to receive input audio, such as via at least a first of the one or more microphones, or any other input audio port, such as an audio jack to implement an active noise cancelling function.

It is an advantage of the present invention that the second mode in which a hear-through audio signal is provided to the speaker allows the user to engage in a conversation with another person in the vicinity of the user without taking the headset off in that the hear-through function allows the user to hear the ambient sound.

In some embodiments, the headset may be configured to furthermore have a third operating mode. The third operating mode may be an in-call hear-through sidetone mode allowing the user to hear his own voice naturally while talking.

In the third mode, a communication microphone may be provided on a microphone boom or in the earphone, and the audio signal from the communication microphone may be provided as an in-call hear-through sidetone audio signal to the speaker. The audio signal from the communication microphone may be processed before being provided to the speaker, and may for example be attenuated before being provided as the in-call hear-through sidetone audio signal to the speaker.

Thus, the method according to the present disclosure may further comprise, in a third operating mode, receiving voice via the communication microphone to provide a voice signal, supplying the voice signal as an in-call hear-through sidetone signal to the speaker, wherein when the headset is operated in the first mode and the call signal indicates that a user is in a call, detecting whether the user is speaking using the voice activity detector, switching to the third operating mode if it is determined that the user is in a call and is speaking to provide the in-call hear-through sidetone signal to the speaker.

The headset for voice communication typically comprises at least one earphone having a speaker and one or more microphones, wherein the speaker is configured to provide an audio signal to the ear of a user when the headset is positioned in the intended operational position of a user's head. The headset may furthermore comprise at least one communication microphone being configured for, and positioned accordingly, to receive a user's voice when positioned in the intended operational position of a user's head. The communication microphone may be provided in the earphone, or the communication microphone may be provided in a microphone boom of the headset, the microphone boom being configured to accommodate one or more communication microphones.

Headsets for voice communication may be used in a variety of settings or scenarios, indoors and outdoors, in office environments, call center environments, street environments, manufacturing environments, machining operation environments, heavy equipment environments etc., in different noisy environments. The headset may be monaural or stereo headsets.

Often user's find comfort in using headsets comprising noise cancelling functionalities, such as noise cancelling functionalities provided in the earphones. It should be envisaged that the term noise cancelling in the present disclosure comprises noise suppression, noise dampening, noise attenuation, etc. Thus, the noise part of a signal may be reduced using the noise cancelling functionalities as disclosed herein. In some embodiments a noise cancelling functionality may enclose attenuation of e.g. ambient noise, by at least 3 dB, such as by at least 6 dB, such as by at least 12 dB, in at least a certain frequency range, such as in at least an optimum frequency range.

The headset may further comprise a passive noise cancelling functionality. Passive noise cancellation may for example be provided using the physical features of an earphone of the headset, such as the design and the material used. Some earphones may be cushioned, and the earphones may be designed to cover the entire ear when worn in the intended operational position of a user's head. Such a passive noise cancellation may typically be designed to provide insulation against ambient noise, and may be particularly well-suited to filter out irregular noises and/or high-frequency noises, such as for example voices in an office environment.

To provide active noise cancellation, typically, ambient audio is detected and analysed where after a noise cancelling signal is generated cancelling out the ambient audio. Thus, typically, an electronic noise cancelling circuit of the headset is configured to receive ambient audio via at least a first of the one or more microphones to implement an active noise cancelling function and to provide a noise cancelling audio signal to the speaker. Thus, the at least first of the one or more microphones may transduce the received ambient audio to an ambient audio signal which is provided to the active noise cancelling function.

In some embodiments, the hear-through audio signal is provided via at least a second of the one or more microphones. The hear-through signal may thus be a hear-through ambient signal and the second mode may be a hear-through ambient mode. The at least second microphone may be an ambient microphone providing an audio signal reproducing audio in the ambience of the headset. The at least second microphone may receive ambient audio and transduce the ambient audio to an ambient audio signal which is provided to the speaker. In some embodiments, the ambient audio signal may be processed before being provided to the speaker. Thus, the ambient audio signal may be received by one or more processing elements, processing circuits and/or processors for processing the ambient audio signals before providing the audio signals to the speaker and thus the user. The processing may apply any combination of known signal processing, such as e.g. amplification, attenuation, noise reduction, frequency filtering, spatial filtering, beam forming, reduction of acoustic feedback, level compression etc., in one or more audio signal paths receiving the ambient audio.

The hear-through audio signal may be provided by at least a second of the one or more microphones, however, it should be envisaged that one or more microphones may contribute to the generation of the hear-through signal.

For example, a second primary microphone, a second secondary microphone, etc. may receive ambient audio, and the generated second primary ambient signal, the generated second secondary ambient signal, etc. may be combined to form the hear-through signal. Hereby, a hear-through signal having for example an improved directionality may be provided.

In some embodiments, the hear-through audio signal may be provided from an opening in the headset, such as an opening in the earphone.

In some embodiments, the first microphone and the second microphone may be the same microphone. Thus, the first received ambient audio signal to be provided to the electronic noise cancelling circuit to obtain a noise cancelling signal may be obtained by the same microphone as the ambient audio to be provided as a hear-through audio signal to the speaker.

To obtain a suitable noise reduction many earphones employ both passive and active noise reduction. Typically, passive noise reduction is obtained by acoustic dampening in structural components, such as earphone shells and ear cushions. Active noise cancelling typically actively counteracts ambient audio, i.e. acoustic noise, approaching the wearer's ears, thereby attempting to cancel out and thus remove the noise from the sound reaching the ears.

Passive noise reduction is generally most effective at frequencies above about 1 kHz, while the effect decreases towards lower frequencies and is practically non-existing at frequencies below about 100 Hz. Conversely, active noise cancelling is generally most effective in the frequency range below about 1 kHz, while it is difficult to achieve good results for higher frequencies. Noise reduction using a combination of passive and active noise reduction may thus in principle be made effective within the entire audio frequency range.

For active noise cancelling, the ambient audio is typically recorded by one or more microphones, such as one or more first microphones, such as by a first primary microphone, a first secondary microphone, etc., and provided to a processor which provides the noise cancelling signal as an anti-signal with respect to the ambient audio, which is perceived as noise by the user. The one or more microphones may be positioned on an outer side of the earphone to provide a feedforward microphone signal to the active noise cancelling circuit. Additionally, or alternatively, the one or more microphones may be positioned inside the earphone to provide a feedbackward microphone signal to the active noise cancelling circuit. Typically, the active noise cancelling circuit is an analogue active noise cancelling circuit. However, it is envisaged that the active noise cancelling circuit also may be implemented in a processor, for example for digital processing of the first microphone signals.

It may be advantageous to use more than one microphone to record ambient sound as this may provide an improved estimate of the ambient sound, and thus an improved estimate of the ambient noise.

In some embodiments, the at least first microphone provides a feedforward signal to the electronic noise cancelling circuit. Alternatively, the at least first microphone may provide a feedbackward signal to the electronic noise cancelling circuit. In some embodiments, the headset comprises one or more first microphones, and at least one of the one or more first microphones may provide feedforward signal(s) to the electronic noise cancelling circuit, and additionally, at least another of the one or more first microphones may provide feedbackward signal(s) to the electronic noise cancelling circuit.

The headset may thus be configured to operate in a first mode in which an electronic noise cancelling circuit is configured to receive ambient audio via at least a first of the one or more microphones to implement an active noise cancelling function and to provide a noise cancelling audio signal to the speaker, and in a second mode in which ambient audio is provided as a hear-through audio signal to the speaker. The headset for voice communication furthermore comprises a switching element configured to switch the headset between operating in the first mode and operating in the second mode.

The switching element may be provided within the earphone and may electrically switch between providing audio from the first and second microphones to the speaker, to respectively provide an active noise cancelling signal or a hear-through signal to the speaker. The switching element may be implemented as an on/off switch. In some embodiments the switching element may be an analogue switching element, or the switching element may be implemented in a processor.

The headset furthermore comprises a voice activity detection unit configured to indicate when a user speaks, and the switching element may be configured to switch the headset from operating in the first mode to operating in the second mode when the voice activity detection unit indicates that the user speaks.

The voice activity detection unit may be any voice activity detection unit as known in the art and may comprise a transducer, such as a vibration sensor and/or a microphone for detection of voice activity. The voice activity detection unit may comprise a processor for processing transducer input to identify voice activity, and may process transducer signals, such as for example microphone signals or vibration sensor signals, using a variety of algorithms to determine presence of voice activity.

The voice activity detection unit may provide an indication signal indicating that a user speaks, so that when the voice activity detection unit has determined the presence of voice activity, then an indication signal is provided.

The voice activity detection unit may thus further comprise a processor for receiving a transducer signal, such as a vibration sensor signal and/or a voice activity microphone signal, the processor being configured to process and/or evaluate the transducer signal, such as the vibration sensor signal and/or voice activity microphone signal, to identify voice activity. The processor may be configured to provide the indication signal indicating that a user speaks.

The headset for voice communication may further comprise a call handling function for answering, initiating, and/or ending a call. In some embodiments, connectivity from the headset to a telephone network is provided via a network gateway.

The headset for voice communication may furthermore include a call analysis function distinguishing between periods of interactive conversations and periods when the user just listens in to a call.

The headset may be a wired or a wireless headset. Thus, the connection from the headset to a unit for voice communication may be wired or wireless, and thus the headset may have a wired or a wireless connection to a telephone, a computer, etc. for providing access to a telephone network. The wireless connection may be provided using any wireless standard, such as DECT, Bluetooth, Bluetooth low energy, etc.

The DECT standard (digital enhanced cordless telecommunication) is a standard primarily used for creating cordless phone systems. DECT may be used in home and small office systems, and is also available in many PBX systems for medium and large businesses. The DECT standard includes a standardized interoperability profile for simple telephone capabilities, called GAP, which most manufacturers implement. GAP-conformance enables DECT handsets and bases from different manufacturers to interoperate at the most basic level of functionality, that of making and receiving calls. The standard also contains several other interoperability profiles, for data and for radio local-loop services.

For all connections, wired and wireless, the headset for voice communication connects to a telephone network, such as the public switched telephone network, a software application or program implementing Voice over IP, such as Skype, Skype for business, Microsoft Lync, Microsoft Messenger etc. Typically, the connection to the telephone network in whichever form, is provided through a network gateway.

For example, the DECT standard fully specifies a means for a portable unit, such as a cordless telephone, to access a fixed telecoms network via radio, but does not specify any internal aspects of the fixed network itself. Connectivity to the fixed network, which may be of many different kinds, is done through a base station or "Radio Fixed Part" to terminate the radio link, and a network gateway to connect calls to the fixed network. The network gateway connection may connect to the public switched telephone network or telephone jack, or to programs or program applications implementing Voice over IP.

In some embodiments, connectivity from the headset to a telephone network is provided via a network gateway, the network gateway being open, when the user is in a call, and the network gateway being closed when the user is not in a call. The call signal may indicate whether the network gateway is open or closed.

Typically, the network gateway is open when the user is in a call, and, typically, the network gateway is closed when the user is not in a call. Thus, the user is said to be in a call when the network gateway is open and there, thus, is a connection between the headset and the telephone network. Likewise, the user is said not to be in a call, when the network gateway is closed and there, thus, is no connection between the headset and the telephone network.

The headset for voice communication may be configured to detect whether a call is ongoing, and to provide a call signal in response to the detection. The call signal may thus indicate whether the network gateway is open or closed.

The call signal may be provided to the switching element, and may at least partly control the switching element to switch between the first mode and the second mode, or vice versa.

In some embodiments, the headset is configured to operate in a first mode in which an electronic noise cancelling circuit is configured to receive ambient audio via at least a first of the one or more microphones to implement an active noise cancelling function and to provide a noise cancelling audio signal to the speaker, and in a second mode in which ambient audio is provided as a hear-through audio signal to the speaker. When the headset is operated in the first noise cancelling mode, and the user of the headset is not in a call, the voice activity detection unit may detect that the user speaks. In such a scenario, the switching element is configured to switch the headset from operating in the first mode, the noise cancelling mode, and to operating in the second hear-through mode.

It is advantageous to switch to a hear-through mode when the user starts speaking while the user is not in a call, as most likely, the user starts speaking to someone in the vicinity of the user, and the user would like to be able to hear any answers which may be provided in response to the speaking.

Thus, the headset may be operated in the second mode, the hear-through mode, for a period of time following the switch to the second mode to enable the user to hear any answer provided.

In some embodiments, a third mode may be provided, the third mode being an in-call hear-through sidetone mode allowing the user to hear his own voice naturally while talking. It may be advantageous to use a third microphone, such as a communication microphone, to provide an in-call hear-through sidetone mode, the communication microphone being for example a communication microphone provided on a microphone boom, or otherwise configured for detection of the user's voice while in a call. In some embodiments, it may be advantageous to operate the headset in the third mode while the user is in a call, especially in a noisy environment, as the user will then primarily hear his own voice naturally, but not necessarily ambient audio.

In the third mode in which an in-call hear-through sidetone audio signal is provided to the speaker, the audio signal from the communication microphone used for picking up the user's own voice is suitably processed, e.g. typically attenuated, and provided as an in-call hear-through sidetone audio signal to the speaker. The headset may be configured to switch back to operating in the first mode either by a user action explicitly re-activating the first mode or by the expiration of a timer which times the absence of the voice activity detection or by a termination of a call.

The operation of the headset for voice communication in different modes according to the user scenario may be illustrated in the table I:

TABLE I

|  | Voice activity detected | Voice activity not detected |
| --- | --- | --- |
| In call | First mode | First mode |
| Not in call | Second mode | First mode |

In the example discussed above, in which a third mode may be provided for allowing the user to hear his own voice naturally when he is in a call, the operation of the headset for voice communication may be illustrated in table II:

TABLE II

|  | Voice activity detected | Voice activity not detected |
| --- | --- | --- |
| In call | Third mode | First mode |
| Not in call | Second mode | First mode |

In some embodiments, a further switching element may be provided for switching between operating in the third mode and operating in the first mode. Alternatively, one switching element may be provided for switching between operating in the first mode, operating in the second mode and operating in the third mode.

In some embodiments, the switching element may be configured to switch the headset between operating in the first mode and operating in the third mode to provide an in-call hear-through sidetone audio signal to the speaker. Thus, when the headset is operated in the first mode and the call signal indicates that the user is in a call, the switching element may be configured to switch the headset from operating in the first mode to operating in the third in-call hear-through side tone mode when the voice activity detection unit indicates that the user speaks. The third in-call hear-through side tone mode enables the user to hear his or her own voice thus mitigating the Lombard effect whereby the user raises voice level when the user cannot hear his/her own voice. Hereby a more natural listening and talking experience may be obtained.

In some embodiments the headset may furthermore comprise a system for analysing the call based on voice activity detection and distinguishing between time periods when the user is just listening in ("in-call, listening state") and time periods when the user is engaged in an interactive conversation ("in-call, interactive state"). During the in-call interactive state the headset may operate in the third mode. The change from the in-call interactive state to the in-call listening state may be determined by the expiration of a timer, e.g. timing the lack of voice activity.

The present invention relates to different aspects including the headset for voice communication, and the method of operating the headset for voice communication described above and in the following, and corresponding elements, units, methods, devices, systems, intermediate systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
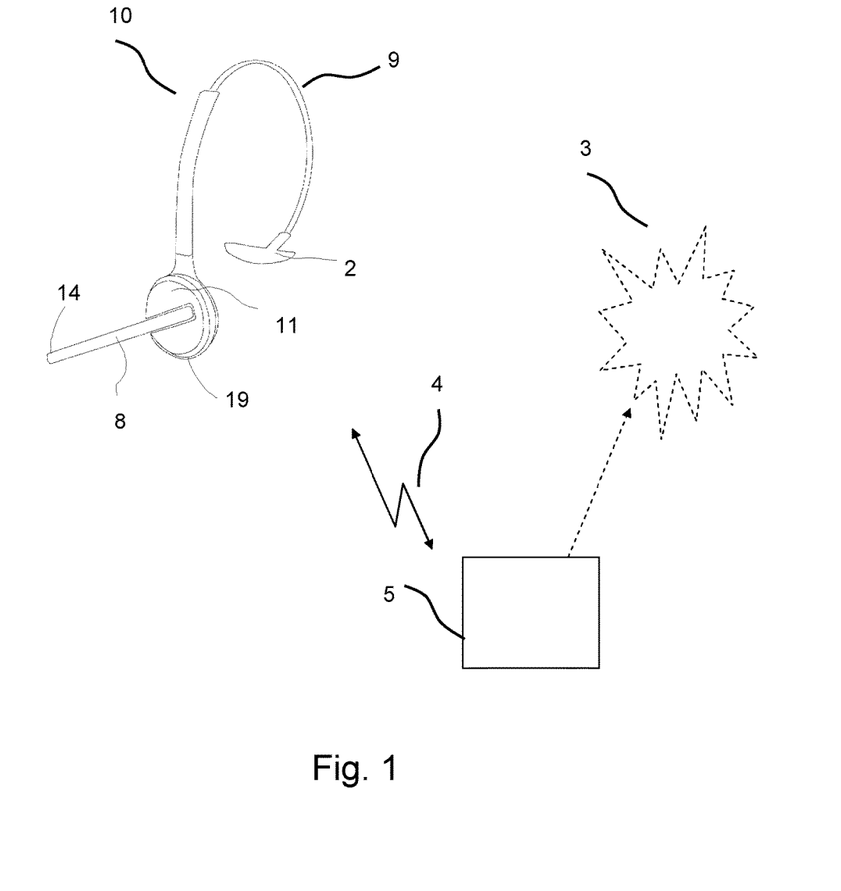
FIG. 1 schematically illustrates an example of a headset for voice communication, FIG. 2 schematically illustrates another example of a headset for voice communication, FIG. 3 schematically illustrates a further example of an earphone for a headset for voice communication.

FIG. 1 shows a headset 10 for voice communication, the headset 10 having an earphone 11, configured to be placed over the ear of a user such that the user can hear audio transmitted to the headset, a wearing style element, i.e. a headband 9, configured to rest on the top of the head of the user wearing the headset, a microphone boom 8 attached to the earphone comprising one or more communication microphones 14 for capturing the voice of the user, and a rest part 2 supporting the headset to the head of the user at the ear opposite the ear where the earphone 11 is placed. Optionally, the headset comprises an earphone cushion 19. It is envisaged that the present disclosure relates to any headset for voice communication, and thus, headsets having any wearing style, including over-the-head, behind-the-neck, over-the-ear, in-the-ear, etc. Furthermore, also any positioning of the communication microphone 14 for capturing the voice of the user is envisaged, and thus the headset may have the communication microphone 14 for capturing the voice of a user provided in or at a microphone boom, at the earphone, or the communication microphone 14 for capturing the voice of a user may be positioned at a cord or cable as connected to the earphone. Likewise, the headset may be a monaural headset having a single earphone, or the headset may be a stereo headset having two earphones. The earphones may be in-the-ear earphones, circumaural earphones, supraaural earphones, etc.

Figure 2:
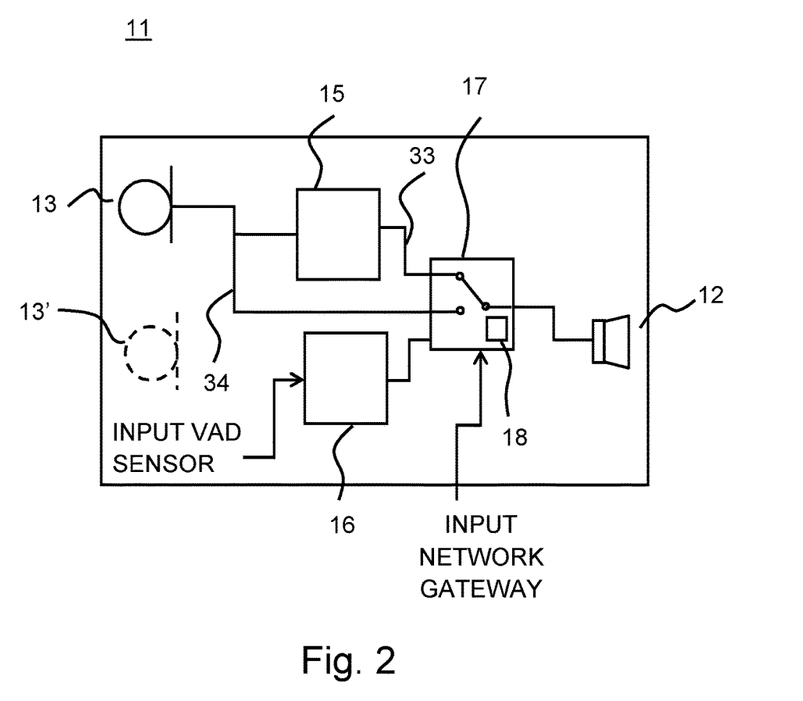

The headset may be a wired or a wireless headset, or any combination thereof, and may as shown be configured to communicate via a wireless link 4 either directly or via an electronic device 5 to a network 3. When the headset 10 is connected to the network 3 a network gateway (not shown) is opened between the headset 10 and the network 3. The network may be any network, such as an internet network for IP communication, a cellular network, or a public switched telephone network, etc. In FIG. 2, the earphone 11 is shown in more detail. The earphone 11 has a speaker 12 and one or more microphones 13, 13'. The earphone furthermore comprises an electronic noise cancelling circuit 15. Typically, the electronic noise cancelling circuit is configured to generate anti-noise signals which destructively interfere with ambient sound to cancel the ambient sound.

The electronic noise cancelling circuit 15 of the headset is configured to receive ambient audio via at least a first of the one or more microphones 13, 13' to implement an active noise cancelling function and to provide a noise cancelling audio signal to the speaker 12. The earphone further comprises a voice activity detection unit 16 configured to indicate when a user speaks. The voice activity detection unit 16 typically receives input from a voice activity detection sensor, such as a microphone 14, a vibration sensor (not shown) or the like. Switching element 17 is configured to switch the headset between operating in the first mode in which a noise cancelling signal 33 is provided to the speaker and the second mode in which a hear-through signal 34, i.e. ambient audio, is provided to the user. The switching element 17 may comprise a controller 18, controlling the switching of the switching element 17. The switching element 17 may be an electronically controlled switching element 17.

Figure 3:
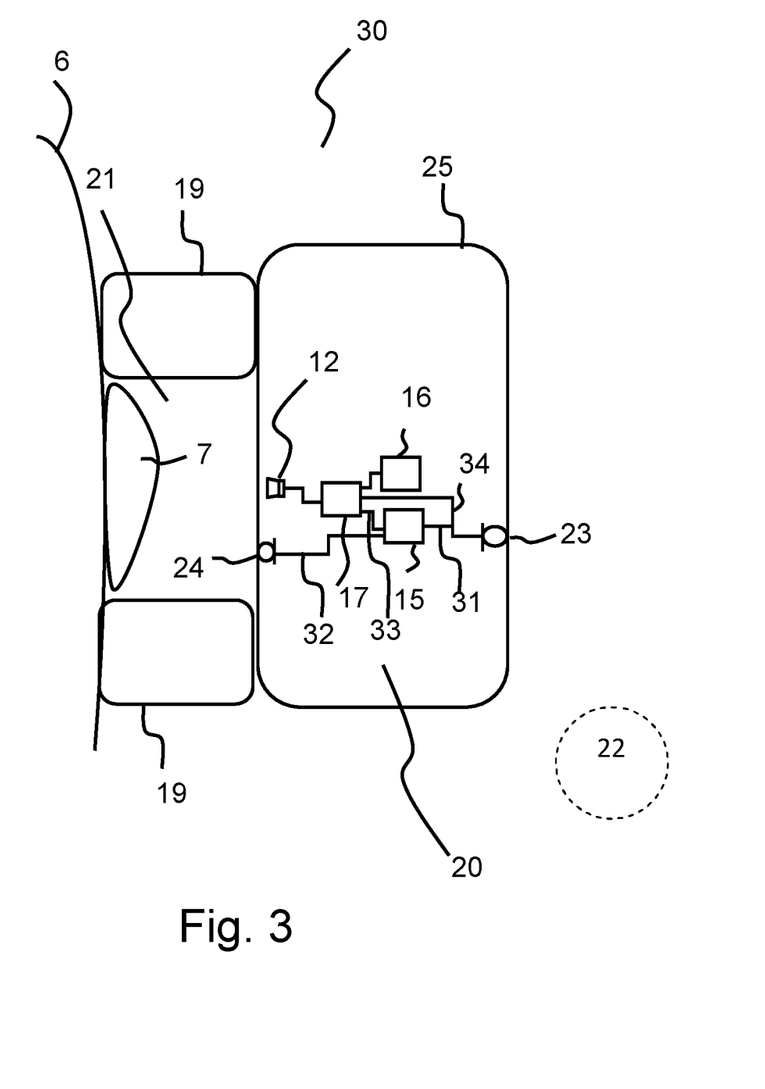

FIG. 3 shows another exemplary earphone 30 according to the present disclosure. The earphone 30 is an over-the-ear earphone. It is seen that the ear 7 is encapsulated by the earphone and the cushion 19 rests on the head 6 of the user to provide for a closed front cavity 21. The cushion 19 is arranged and adapted to attenuate acoustic signals entering the front cavity 21 from ambient space 22 when the earphone 30 is positioned in the operating position covering the ear of a user. The ear cushion 19 may be permanently or detachably attached to the housing 25 in any known way, e.g. by means of adhesives, screws, snap couplings and/or bayonet couplings. As seen in FIG. 3, the noise cancelling circuit 15, the voice activity detector 16 and the switching element 17 are provided within the earphone housing 25. It is however envisaged that one or more parts may be provided outside the earphone housing, either on a cable, in a microphone boom, in an attachment to a headband, etc. The rear cavity 20 is separated from the front cavity 21 and from ambient space 22 by earphone housing 25.

During use, a first microphone 23 may provide a feed forward signal 31 to the noise cancelling circuit 15, and/or the second microphone 24 may provide a feedbackward signal 32 to the noise cancelling circuit 15 to implement the noise cancelling signal. The hear-through signal 34 may be provided directly to the speaker 12, or the hear-through signal 34 may be amplified, filtered, beam formed, etc. before being delivered to the speaker 12. In some embodiments, the hear-through signal is provided via microphone 13, 23, in some embodiments, the hear-through signal may be provided via an opening (not shown) in the earphone housing 25, such as an opening which may be closed when it is not intended to provide a hear-through signal.

Figure 4:
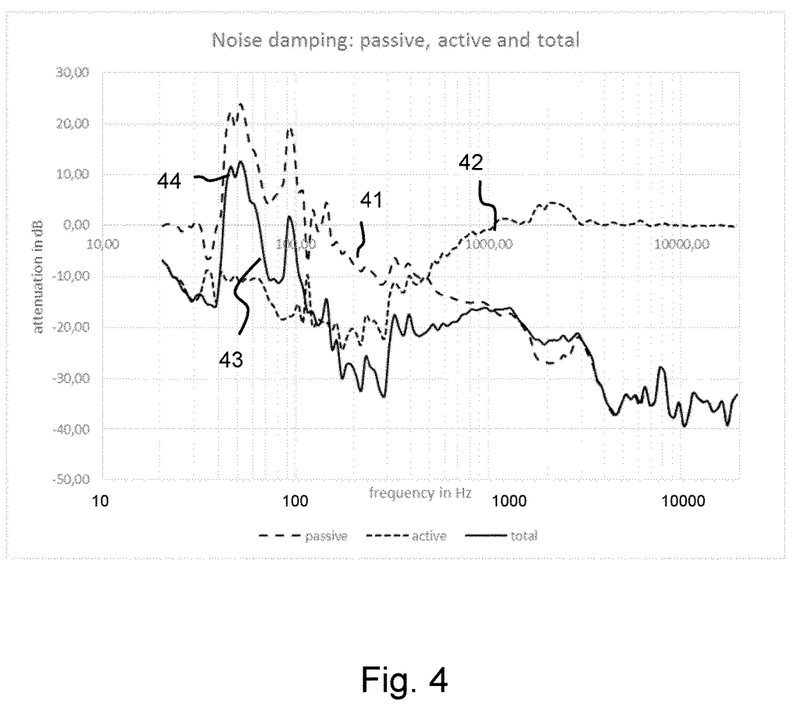
FIG. 4 shows a graph exemplifying the noise reduction using passive and active noise cancellation.

FIG. 4 shows the attenuation stemming from active, passive and total noise dampening as a function of the frequency. It is seen that the passive noise dampening or passive noise reduction, curve 41, e.g. as provided be ear cushion 19, is most efficient at frequencies above 1 kHz, in which area it may be e.g. greater than 20 dB, greater than 10 dB or greater than 6 dB. It is furthermore seen from FIG. 4 that the active noise dampening, or active noise cancelling, curve 42, is most efficient at frequencies below approx. 1 kHz. The total noise dampening as provided by the combination of active and passive noise dampening is shown by curve 43 and is seen to provide noise reduction at low and high frequencies, however with a few peaks 44 of noise in the low frequency range.

Figure 5:
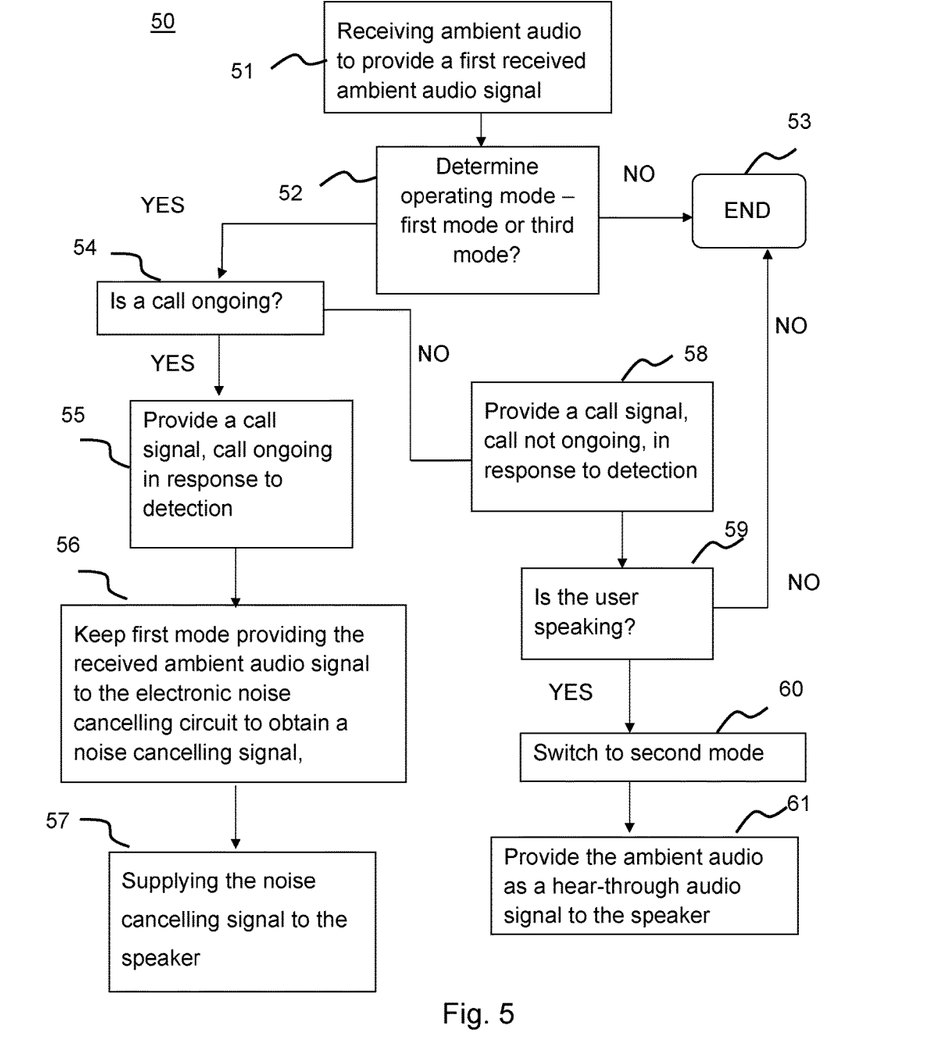
FIG. 5 is a flowchart of a method of operation of the headset for voice communication.

FIG. 5 is a flowchart 50 of a method according to the present disclosure. In step 51, ambient audio is received in a headset and a first received ambient audio signal is provided. In step 52, it is determined if the headset is operated in the first mode, or possibly in the third mode. If NO, the process is ended in 53. If YES, it is determined if a call is ongoing in step 54. If YES, and it is thus determined that a call is ongoing, a call signal is provided in step 55 to indicate that a call is ongoing, for example by indicating that the network gateway is open. In step 56, the first mode, and/or possibly the third mode, is maintained and the received ambient audio signal is provided to the electronic noise cancelling circuit to obtain a noise cancelling signal. In step 57, the noise cancelling signal is provided to the speaker. If it in step 54 is determined that a call is not ongoing, a call signal setting out that no call is ongoing is provided in step 58, for example by indicating that the network gateway is closed. Hereupon, it is in step 59 determined if the user is speaking, e.g. by using a voice activity detector, VAD. If the user is not speaking, the process is ended in step 53. If the user is speaking, the headset is switched to operate in the second mode in step 60, and the ambient audio is provided as a hear-through audio signal to the speaker in step 61. Thereby, the user may be for example be allowed to hear a response from a person talking to the user.

It should be envisaged that the first mode, providing active and/or passive noise cancellation to the user, is a regular use mode, configured to be used when wearing the headset during normal use and when in a call. Hereby, the user may experience active and/or passive noise cancelling during normal use and when in a call. When the headset is operated in the first mode and when the user is in a call, an additional mode may be applied, i.e. the third mode to thereby provide the user with active and/or passive noise dampening during a call but at the same time allow the user to hear his own voice naturally. This may be particularly advantageous in noisy environments in which a user is dependent on the noise dampening features of the headset to be able to conduct a telephone conversation using the headset. It is an advantage of the headset according to at least some embodiments of the present invention that the user while wearing the headset in the operational position, may start talking to e.g. a nearby person, whereupon the headset automatically switches to a hear-through mode, allowing the user to hear any responses or feedback in response turn to the talk of the user without having to manually adjust the headset or switch the headset from one operating mode to another. It should be envisaged that operational elements of headsets are typically small and delicate elements, and the switching from one mode to another manually may be difficult or may require that the headset is removed from the operational position in order to switch mode. It is thus advantageous that the present invention allows for automatic adjustment of the mode, such as to automatic switching to a hear-through mode when the user is talking while not in a call.

The hear-through mode may be maintained for a specific time after the headset has been switched to hear-through mode, additionally or alternatively, the specific time may be reset for each VAD signal indicating that the user is speaking, so that the headset is maintained in hear-through mode for a specific time following each detection of voice activity while the user is not in a call. The VAD may continuously check for voice activity, or the VAD may discretely check for voice activity. In some examples, when the VAD comprises a microphone to check for voice activity, the microphone signal may be digitized and be sampled at a sample frequency of e.g. 16 kHz, and may be split into overlapping frames, such as frames being 20-40 ms in length. A frame may be extracted every 10 ms, such as every 20 ms, etc., thus each frame may comprise a multiplicity of samples. Thus, the VAD may for example check for voice activity every 10 ms, such as every 20 ms, etc.

Figure 6:
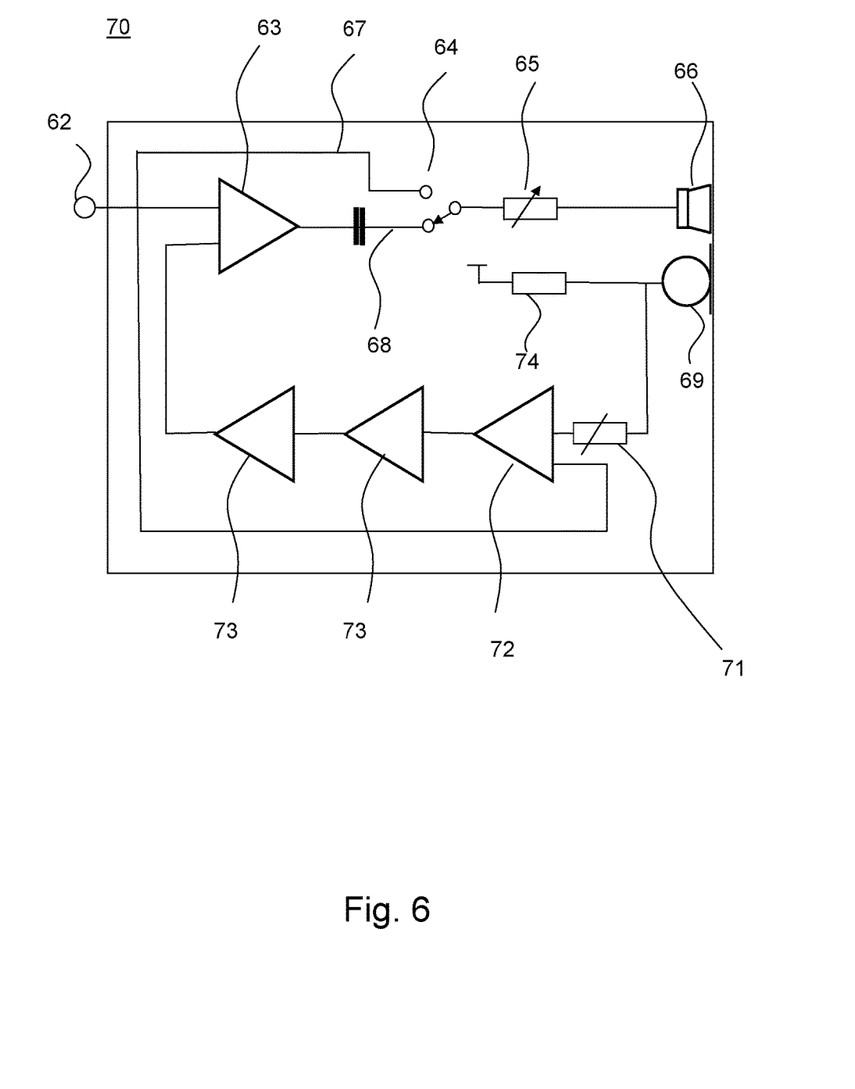
FIG. 6 shows schematically an earphone with a noise cancelling function.

FIG. 6 shows schematically an earphone, such as an earphone of a headset, having a feedback active noise cancelling design 70. The earphone 70 may operate in a noise cancelling mode in which received audio is noise cancelled, or the headset 70 may operate in a non-noise cancelling mode in which received audio is provided to the user without noise reduction. Audio, such as input audio, such as for example music, radio, voice, etc. is received via audio jack 62. The audio is fed to either a differentiator 63, receiving input audio from the audio jack 62 and a feedback signal through filters 73 to provide a noise cancelling signal 68, or the audio is provided directly to switch 64. Switch 64 allows switching between noise cancelling mode in which switch 64 switches the noise cancelling signal 68 to the speaker 66, or in a non-noise cancelling mode in which switch 64 switches the received audio to the speaker 64 as a hear-through signal 67 without noise cancelling. An amplifier 65 may amplify the signal before providing the signal to the speaker 66. Bias 74 is provided as shown. A feedback microphone 69 receives ambient audio from within the earphone and feeds the ambient audio through gain 71, differentiator 72 and filters 73 back to the differentiator 63. The differentiator 72 receives input from both the feedback microphone 69 and from the input audio. This earphone design allows for providing a noise cancelling audio signal to a user, when operated in the active noise cancelling mode.

Figure 7:
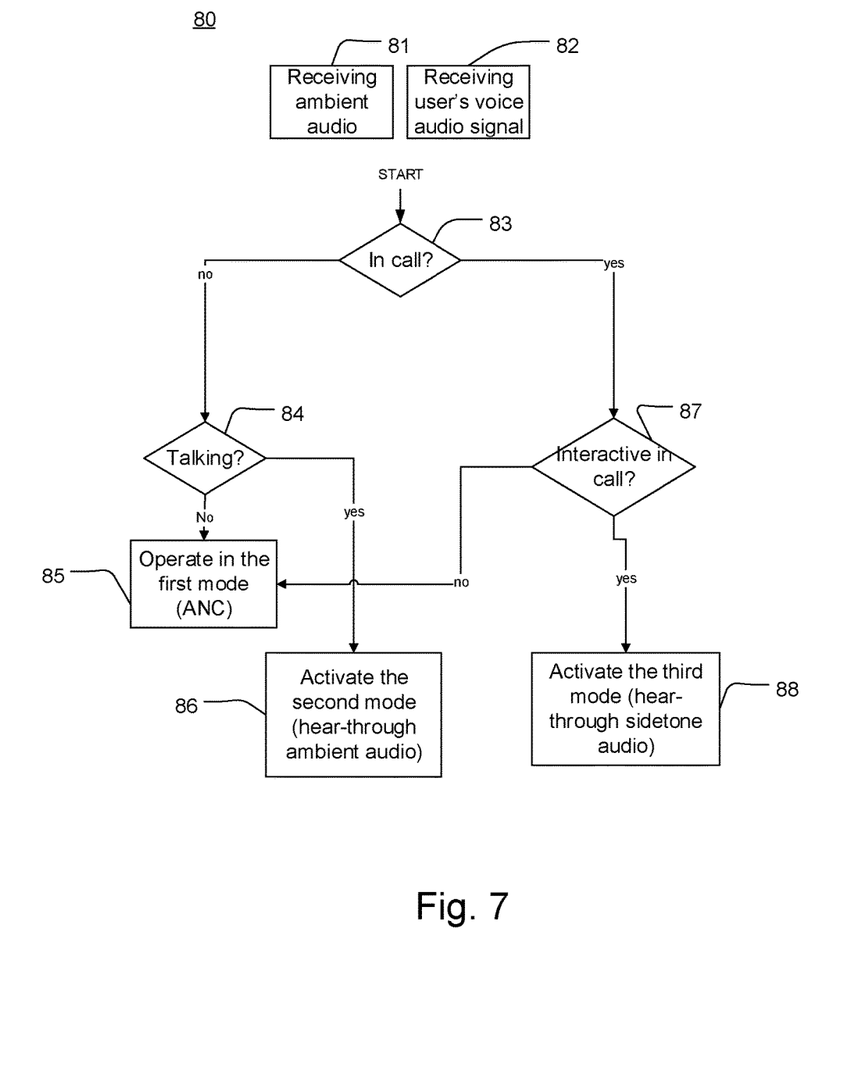
FIG. 7 shows a decision tree for the operation of a headset, according to the present disclosure.

FIG. 7 shows a decision tree for the operation of a headset according to the present disclosure in which the headset is configured to operate in a first mode, a second mode and a third mode. The decision tree 80 indicates that in 81, ambient audio is received and in 82 a user's voice audio signal is received. Step 83 decides whether the user is in a call. If no, it is determined in step 84 whether the user is talking. If no, the headset is (continuously) operated in the first mode, step 85, in which an active noise cancelling signal is received at the speaker. If it in step 84 is determined that the user is talking, the second mode, i.e. hear-through ambient audio, is activated in step 86.

If it, in step 83 is determined that the user is in a call, then it is determined in the decision step 87 whether the user is interactive in the call. If it is determined that the user is not interactive in the call, and thus just listens in, then the headset is operated in the first mode, i.e. the ANC mode, cf.

step 85. If it, in step 87, is determined that the user is interactive in the call, the third mode, i.e. in-call hear-through sidetone mode is activated in step 88.

Figure 8:
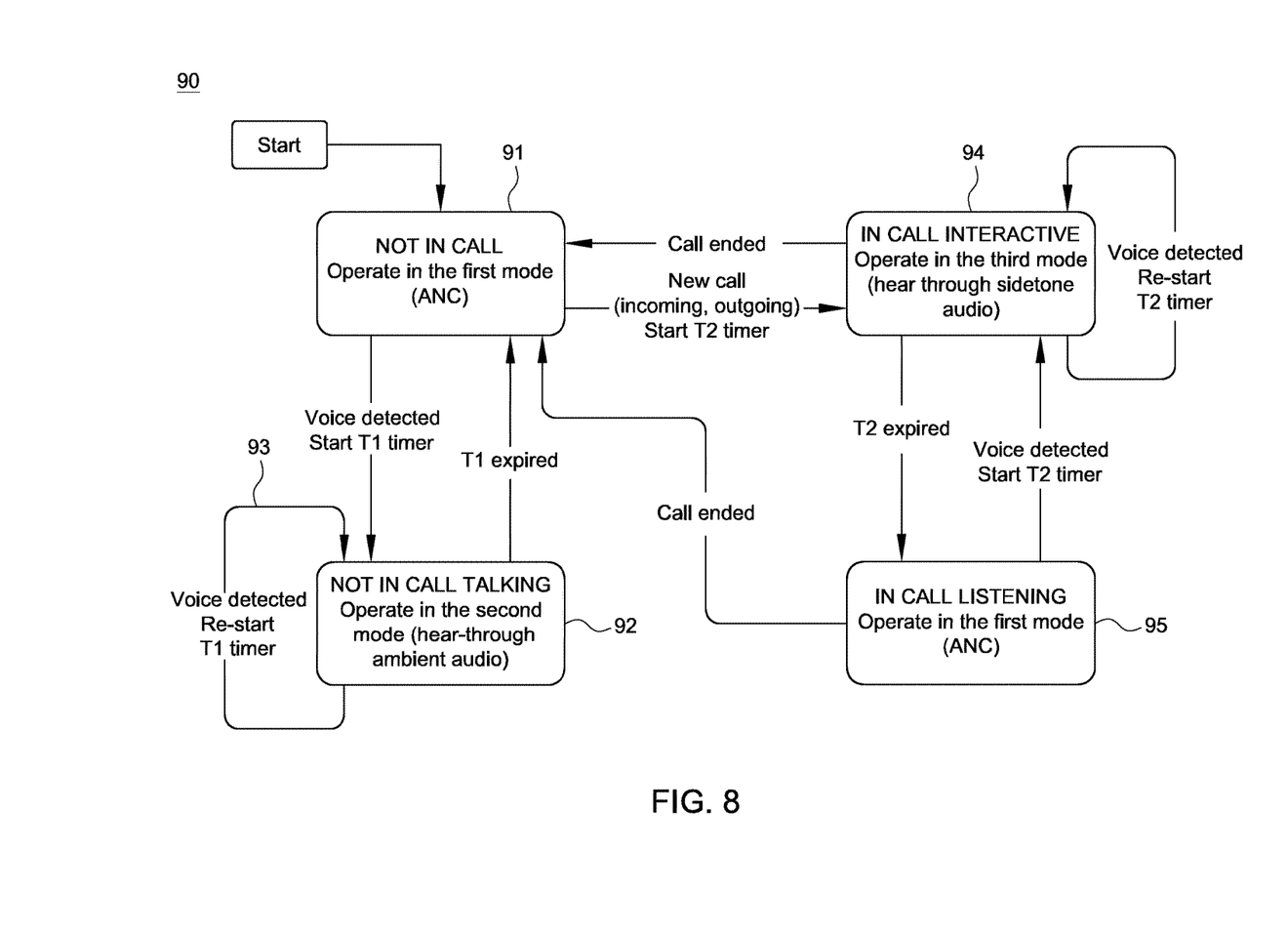
FIG. 8 shows a state diagram for the operation of a headset according to the present disclosure.

FIG. 8 shows a state diagram 90 for the operation of a headset according to the present disclosure. It is seen from state 91 that when a user is NOT IN CALL, the headset is operated in the first mode, i.e. the ANC mode. When voice is detected, e.g. by a voice detection unit as mentioned above, a timer T1 is activated, and the headset is operated in the second mode, see state 92, NOT IN CALL TALKING, in which hear-through of ambient audio is provided to the speaker. Each time voice activity is detected, the timer T1 is re-started, see 93. If no voice activity is detected, the timer T1 will expire, and upon expiration of timer T1, the operation will revert to NOT IN CALL mode, state 91.

In state 94, the headset is operated in an IN CALL INTERACTIVE mode, e.g. when a new call is coming in or going out. A timer T2 is started upon call initiation. If voice is detected, the timer T2 is re-started. When T2 expires, i.e. the headset is operated in state 95 IN CALL LISTENING, and the headset is operated in the first mode, i.e. ANC mode. If voice is detected during the call, the timer T2 is re-started, and the headset is operated in the third mode, i.e. in-call hear-through side tone mode. When the call is ended, the headset is reverted to state 91 NOT IN CALL and operated in the first mode.

Figure 9:
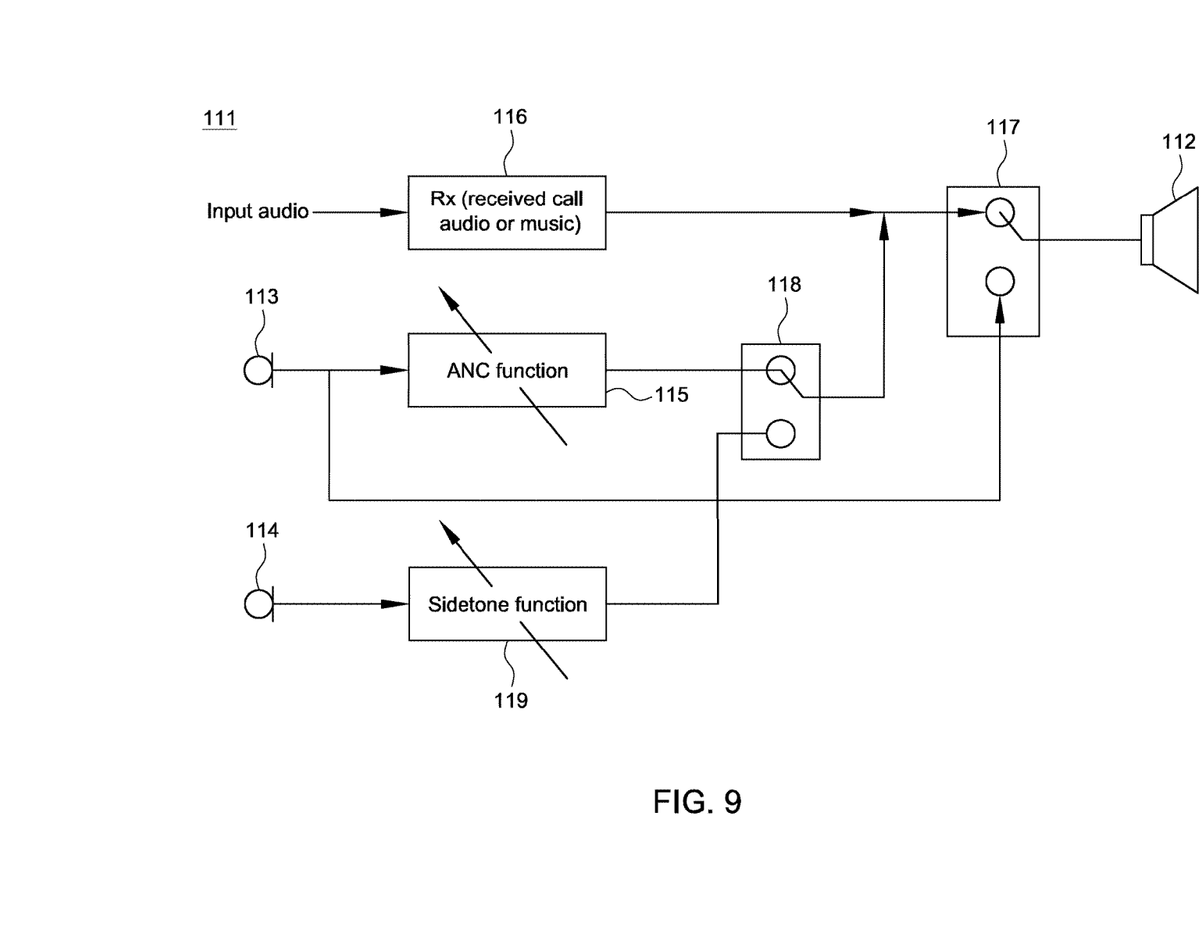
FIG. 9 shows a diagram of a headset according to the present disclosure.

FIG. 9 shows a diagram of a headset 111 according to the present disclosure. The headset 111 comprises an ambient sound microphone 113, and a voice pick-up microphone 114 typically used for voice communication. Input audio may be received via an input receiver 116, such as an audio jack, etc. The input audio may for example be a received call, audio or music. The ambient sound signal from microphone 113 may be provided directly to the first switch 117, or the ambient sound signal from microphone 113 may be provided to the active noise cancelling circuit 115 before being provided to the first switch 117. The active noise cancelled signal may be added to the input audio before switching. The first switch 117 may thus switch between the first mode (or the third mode) and the second mode, i.e. between ANC/sidetone audio and hear-through audio.

A second switch 118 is provided to switch between the first mode and the third mode, i.e. between active noise cancelling audio and an in-call hear-through sidetone audio. It should however be envisaged that the sidetone signal from microphone 114 in some embodiments may be provided to the speaker 112 as an additional signal. The signal from the voice pickup microphone 114 may be processed, such as attenuated, in the processor or circuit 119 implementing the sidetone function. It should be noted that both the processor or circuit 115 and 119 are variables and may be turned off.

The speaker 112 provides the audio signal as determined by switches 117, 118 to the ear of a user.

REFERENCE NUMERALS 2 rest part
3 network
4 wireless connection
5 electronic device
6 head of a user
7 ear of a user
8 microphone boom
9 headband
10 headset
11 earphone
12 speaker
13, 13' microphones
14 microphone for voice communication, third microphone
15 electronic active noise cancelling circuit
16 voice activity detection unit
17 switching element
18 controller
19 ear cushions
20 rear cavity
21 front cavity
22 ambient space
23 first microphone
24 second microphone
25 earphone housing
30 earphone
31 feedforward signal
32 feedbackward signal
33 noise cancelling signal
34 hear-through signal
41 passive noise dampening
42 active noise dampening
43 total noise dampening
44 low frequency peak
62 audio jack
63 differentiator
64 switch
65 amplifier
66 speaker
67 hear-through signal
68 noise cancelling signal
69 feedback microphone
70 earphone
71 gain
72 differentiator
73 filters
74 bias
111 headset
112 speaker
113 microphones
114 microphone for voice communication, third microphone
115 electronic active noise cancelling circuit
116 receiver for receiving input audio
117 first switching element
118 second switching element
119 sidetone processor Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A headset for voice communication, the headset comprising:
    at least one earphone having a speaker;
    one or more microphones, and at least first microphone of the one or more microphones configured to receive ambient audio;
    a user microphone positioned toward a user of the headset and configured to receive a user speech of the user of the headset, and wherein the headset for the voice communication being configured to detect whether a phone call is ongoing, and providing a call signal in response to the detection of the ongoing of the phone call on the headset, and wherein the headset being configured to operate in a first, second, and third modes;
an electronic noise cancelling circuit coupled to the at least first microphone of the one or more microphones and, in said first mode, the electronic noise cancelling circuit is configured to receive the ambient audio via the at least first microphone to implement an active noise cancelling function and to provide a noise cancelling audio signal to said at least one earphone, and in the second mode in which the ambient audio is provided as a hear-through audio signal in user listening only periods to the speaker of the at least one earphone without implementing the active noise cancelling function by the electronic noise cancelling circuit, and in said third mode, a side tone-audio is provided to the user of the headset;
a voice activity detector coupled to the user microphone and configured to indicate when the user of the headset is in an interactive conversation;
a switching element coupled to the electronic noise cancelling circuit and the voice activity detector and configured to distinguish between the interactive conversation and the user listening only periods and configured to automatically switch the headset from operating in the first mode to operating in the second mode when said voice activity detector detects the user speech from said user microphone and indicates that the user is in the interactive conversation and when the phone call signal indicates that the user is not in the ongoing of the phone call, and configured to automatically switch from the first mode into the third mode when said voice activity detector detects the user speech from said user microphone and indicates that the user is in the interactive conversation and the phone call signal indicates that the user is in the ongoing of the phone call.

2. The headset according to claim 1, wherein the headset further comprises a passive noise cancellation.

3. The headset according to claim 1, wherein the hear-through audio signal is also provided via at least a second microphone of the one or more microphones.

4. The headset according to claim 3, wherein the at least second microphone is an ambient microphone providing an audio signal reproducing audio in an ambience of the headset.

5. The headset according to claim 3, wherein the at least first microphone and the at least second microphone are the same microphone.

6. The headset according to claim 1, wherein at least one of the one or more microphones provides a feedback signal or a feedforward signal to the electronic noise cancelling circuit.

7. The headset according to claim 1, wherein the switching element is implemented in a processor.

8. A The headset according to claim 1, wherein the voice activity detector comprises a vibration sensor for detection of voice activity.

9. The headset according to claim 1, wherein the voice activity detector provides an indication signal indicating that the user speaks.

10. The headset according to claim 9, wherein the voice activity detector further comprises a processor for receiving a vibration sensor signal, the processor being configured to evaluate the vibration sensor signal to provide the indication signal indicating that the user speaks.

11. The headset according to claim 1, wherein the headset for voice communication further comprises a call handling function for answering, initiating, and/or ending a call.

12. The headset according to claim 1, wherein connectivity from the headset to a telephone network is provided via a network gateway, the network gateway being open, when the user is in a phone call, and the network gateway being closed when the user is not in a phone call and wherein the call signal indicates whether the network gateway is open or closed.

13. The headset according to claim 1 wherein the call signal at least partly controls the switching element to switch from the first mode to the second mode, or vice versa.

14. A method of operating a headset for use by a user, for voice communication having a noise cancelling function, the headset comprises one or more microphones, one or more earphones, an electronic noise cancelling circuit coupled to at least a first microphone of the one or more microphones and implementing the noise cancelling function, a voice activity detector coupled to a second microphone of said one or more microphones, and a switching element coupled to the electronic noise cancelling circuit, the voice activity detector, and at least second microphone of the one or more microphones, and the headset is operated in a first, a second, and a third operating modes, the method comprising:
receiving an ambient audio signal via the at least first microphone of the one or more microphones to provide a first received ambient audio signal;
receiving a user's voice via the second microphone of said one or more microphones and the second microphone being positioned near the user of the headset to detect the user's voice;
in the first operating mode,
providing the first received ambient audio signal via the at least first microphone of the one or more microphones to the electronic noise cancelling circuit to obtain a noise cancelling signal;
supplying the noise cancelling signal to the one or more earphones;
in the second operating mode,
receiving an ambient audio signal via the at least second microphone of the one or more microphones;
distinguishing between interactive conversations and user listening only periods; and
providing the ambient audio signal received via the at least second microphone of the one or more microphones as a hear-through audio signal in the user listening only periods to the one or more earphones;
in the third operating mode,
providing a side-tone audio to the one or more earphones;
detecting whether a phone call is ongoing by the headset and providing a call signal in response to the detection of the ongoing of the phone call on the headset;
detecting the user's voice by the voice activity detector coupled to the second microphone of said one or more microphones to indicate when the user of the headset is in the interactive conversations;
switching the headset from the first operating mode to the second operating mode by the switching element when the call signal indicates that the user is not in the ongoing of the phone call on the headset and when the user's voice is detected to indicate that the user of the headset is in the interactive conversations by the voice activity detector coupled to the second microphone of the one or more microphones; and switching the headset from the first operating mode into the third operating mode by the switching element when the call signal indicates that the user is in the ongoing of the phone call on the headset and when the user's voice is detected to indicate that the user of the headset is in the interactive conversations by the voice activity detector coupled to the second microphone of the one or more microphones.

15. The method according to claim 14, wherein the headset comprises a communication microphone for receiving the voice of the user, and wherein the method further comprises:
in the third operating mode,
receiving the voice of the user via the communication microphone to provide a voice signal,
supplying the voice signal as an in-call hear-through sidetone signal to the one or more earphones.

16. The method according to claim 15 further including the steps of: initiating a timer with a predetermined count, and after user speech ends and switching back to the first mode when the predetermined count is reached.

17. The method of claim 16 where the timer is restarted each time the user speaks and then stops speaking.

18. A headset for voice communication, the headset comprising:
at least one earphone having a speaker;
one or more microphones, and at least first microphone of the one or more microphones configured to receive ambient audio;
a user microphone positioned toward a user of the headset and configured to receive a user speech of the user of the headset, and wherein the headset for the voice communication being configured to detect whether a phone call is ongoing, and providing a call signal in response to the detection of the ongoing of the phone call on the headset, and wherein the headset being configured to operate in a first, second, and third modes;
an electronic noise cancelling circuit coupled to the at least first microphone of the one or more microphones and, in said first mode, the electronic noise cancelling circuit is configured to receive the ambient audio via the at least first microphone to implement an active noise cancelling function and to provide a noise cancelling audio signal to the speaker, in said second mode in which the ambient audio is provided as a hear-through audio signal in user listening only periods to the speaker of the at least one earphone without implementing the active noise cancelling function by the electronic noise cancelling circuit;
a voice activity detector coupled to the user microphone and configured to detect user's speech and indicate when the user of the headset is in an interactive conversation and in said third mode in which some of the user speech of the user of the headset is provided to the speaker when the user's speech is detected by the voice activity detector and indicate that the user's speech is detected and when the call signal indicates that the user is in the ongoing of the phone call and wherein the headset is operated initially in the first mode when the call signal indicates that the user is not in the ongoing of the phone call and when said voice activity detector does not detect the user speech from said user microphone and indicates that the user is not in the interactive conversation;
a switching element coupled to the electronic noise cancelling circuit and the voice activity detector and configured to distinguish between the interactive conversation and the user listening only periods and configured to drive the headset in said first, said second, and said third modes, the switching element being configured to automatically switch the headset from operating in the first mode to operating in the second mode when said voice activity detector detects the user speech from said user microphone and indicates that the user is in the interactive conversation and when the call signal indicates that the user is not in the ongoing of the phone call, and the switching element is further configured to automatically switch from the first mode into the third mode when said voice activity detector detects the user speech from said user microphone and indicates that the user is in the interactive conversation and when the call signal indicates that the user is in the ongoing of the phone call, and the switching element is configured to revert to the first mode when said voice activity detector does not detects the user speech from said user microphone and indicates that the user is not in the interactive conversation and when the call signal indicates that the user is in the ongoing of the phone call.

19. The headset of claim 18 further including a timer triggered by said voice activity detector and configured to count a predetermined time after a user stops speaking and instruct the switching element to switch back to the first mode after the predetermined time has expired.

20. The headset of claim 19 wherein said time is restarted every time the user speaks and then stops speaking.

* * * * *